United States Patent
Sakaki et al.

(10) Patent No.: US 8,633,275 B2
(45) Date of Patent: Jan. 21, 2014

(54) RUBBER COMPOSITION FOR BREAKER AND PNEUMATIC TIRE

(75) Inventors: Toshiaki Sakaki, Kobe (JP); Naoya Ichikawa, Kobe (JP); Masako Iwamoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 193 days.

(21) Appl. No.: 13/117,182

(22) Filed: May 27, 2011

(65) Prior Publication Data

US 2011/0294949 A1   Dec. 1, 2011

(30) Foreign Application Priority Data

May 28, 2010   (JP) .................................. 2010-123270
Mar. 22, 2011   (JP) .................................. 2011-063043

(51) Int. Cl.
   *C08L 9/00*   (2006.01)

(52) U.S. Cl.
   USPC .......................................... 524/572; 524/571

(58) Field of Classification Search
   USPC ....................................................... 524/572
   See application file for complete search history.

(56) References Cited

U.S. PATENT DOCUMENTS

| | | | |
|---|---|---|---|
| 5,017,636 A | 5/1991 | Hattori et al. | |
| 7,427,646 B2 | 9/2008 | Kondou | |
| 8,163,821 B2 | 4/2012 | Hiro | |
| 8,273,804 B2 | 9/2012 | Nishimura | |
| 2005/0148723 A1 | 7/2005 | Kondou | |
| 2006/0252879 A1* | 11/2006 | Tanaka et al. | 524/571 |
| 2007/0100061 A1 | 5/2007 | Hattori et al. | |
| 2011/0166254 A1 | 7/2011 | Nishimura | |
| 2011/0178235 A1 | 7/2011 | Sugimoto | |
| 2011/0184118 A1 | 7/2011 | Sugimoto et al. | |
| 2011/0230613 A1 | 9/2011 | Hiro | |
| 2011/0253285 A1 | 10/2011 | Ichikawa et al. | |
| 2011/0294949 A1 | 12/2011 | Sakaki et al. | |
| 2013/0030083 A1 | 1/2013 | Taguchi et al. | |
| 2013/0098523 A1 | 4/2013 | Tsumori et al. | |
| 2013/0102722 A1 | 4/2013 | Tsumori et al. | |
| 2013/0123387 A1 | 5/2013 | Kagawa et al. | |

FOREIGN PATENT DOCUMENTS

| | | | |
|---|---|---|---|
| JP | 4-356205 A | | 12/1992 |
| JP | 6-329702 A | | 11/1994 |
| JP | 06-329838 | | 11/1994 |
| JP | 6-329838 A | | 11/1994 |
| JP | 8-143606 A | | 6/1996 |
| JP | 2003-94918 A | | 4/2000 |
| JP | 2002-338734 A | | 11/2002 |
| JP | 2004-67027 A | | 3/2004 |
| JP | 2005082622 A | * | 3/2005 |
| JP | 2006-307018 A | | 11/2006 |
| JP | 2007-169431 A | | 7/2007 |
| JP | 2008-106099 A | | 5/2008 |
| JP | 2009-13196 A | | 1/2009 |
| JP | 2009-13197 A | | 1/2009 |
| JP | 2009001680 A | * | 1/2009 |
| JP | 2010-138359 A | | 6/2010 |
| JP | 2010-174169 A | | 8/2010 |
| WO | WO 03/082925 A1 | | 10/2003 |
| WO | WO 2005/012365 A1 | | 2/2005 |

OTHER PUBLICATIONS

Translation of JP2005-032622, Mar. 31, 2005.*
Translation of abstract of JP 2009001680, Jan. 8, 2009.*
United States Office Action for copending U.S. Appl. No. 13/006,606 dated May 9, 2013.
United States Office Action for copending U.S. Appl. No. 13/006,606 dated Oct. 10, 2012.
United States Office Action for copending U.S. Appl. No. 13/013,849 dated Mar. 13, 2013.
United States Office Action for copending U.S. Appl. No. 13/560,090 dated Aug. 2, 2013.

* cited by examiner

*Primary Examiner* — Hui Chin
(74) *Attorney, Agent, or Firm* — Birch, Stewart, Kolasch & Birch, LLP

(57) ABSTRACT

The present invention provides a rubber composition for a breaker, which achieves both good fuel economy and good breaking performance while simultaneously having excellent processability, and a pneumatic tire including a breaker produced using the rubber composition. The present invention relates to a rubber composition for a breaker, including: a rubber component that contains a modified natural rubber, the rubber having a phosphorus content of 200 ppm or less; and carbon black and/or a white filler, wherein the rubber composition contains 5% by mass or more of the modified natural rubber based on 100% by mass of the rubber component.

5 Claims, No Drawings

RUBBER COMPOSITION FOR BREAKER AND PNEUMATIC TIRE

TECHNICAL FIELD

The present invention relates to a rubber composition for a breaker and a pneumatic tire produced using the same.

BACKGROUND ART

There has been an approach to decrease rolling resistance of a tire to suppress the heat build-up and thus improve fuel economy of a vehicle. The demand for improving fuel economy of a vehicle by means of tire improvement has increased in recent years. In order to improve fuel economy, tread and sidewall improvements have been highly required. Still the demand has been increasing year by year, and other components such as a breaker are required to achieve improvement in fuel economy. Also, tires for high-load vehicles, such as trucks and buses, as well as tires for passenger vehicles are required to have higher fuel economy.

Examples of known methods for achieving low heat build-up of rubber compositions include a method using a low-reinforcing filler, and a method using a smaller amount of reinforcing filler. However, such methods for improving fuel economy using a filler reduction cause reduction in the effect of reinforcing the rubber composition, and thereby problematically cause reduction in breaking performance. Hence, it has been generally difficult to achieve both high levels of fuel economy and breaking performance.

Natural rubber, which has been commonly used for breaker rubbers, has a higher Mooney viscosity than those of synthetic rubbers and thus has low processability. Therefore, natural rubber to be used is usually added with a peptizer and then masticated so that the rubber has a decreased Mooney viscosity. Thus, use of natural rubber decreases productivity. Further, the mastication causes molecular chain scission in natural rubber, thereby problematically leading to a loss of the properties (e.g., rubber strength) of high-molecular-weight polymer which natural rubber essentially has.

Patent Document 1 discloses a rubber composition containing natural rubber that has been deproteinized so as to have a total nitrogen content of 0.1% by mass or less as an index of protein content, which achieves favorable levels of strength, low heat build-up, and processability. However, the rubber composition still has room for improving both fuel economy and breaking performance while simultaneously securing processability.

Patent Document 1: JP H06-329838 A

SUMMARY OF THE INVENTION

The present invention aims to provide a rubber composition for a breaker, which achieves both good fuel economy and good breaking performance while simultaneously having excellent processability, and a pneumatic tire including a breaker produced using the rubber composition.

The present invention relates to a rubber composition for a breaker, including: a rubber component that contains a modified natural rubber, the rubber having a phosphorus content of 200 ppm or less; and carbon black and/or a white filler, wherein the rubber composition contains 5% by mass or more of the modified natural rubber based on 100% by mass of the rubber component.

The modified natural rubber preferably has a nitrogen content of 0.3% by mass or less. Further, the modified natural rubber preferably has a gel content of 20% by mass or less, the gel content being determined as the amount of a toluene-insoluble matter. The modified natural rubber is preferably produced by saponifying natural rubber latex.

The modified natural rubber is preferably obtained by:
(A) saponifying natural rubber latex to prepare a saponified natural rubber latex;
(B) coagulating the saponified natural rubber latex and treating the resulting coagulated rubber with alkali; and
(C) washing the resultant rubber until the phosphorus content in rubber falls to 200 ppm or less.

In the rubber composition, the white filler is preferably silica.

The present invention also relates to a pneumatic tire including a breaker produced using the rubber composition.

The rubber composition according to the present invention is a rubber composition for a breaker, including a specific amount of a modified natural rubber with a low phosphorus content, and carbon black and/or a white filler. When this rubber composition is applied to a rubber composition for a breaker topping to prepare a breaker, a pneumatic tire including this breaker can achieve both good fuel economy and good breaking performance. An unvulcanized rubber composition containing the above components is excellent also in processability.

BEST MODE FOR CARRYING OUT THE INVENTION

The rubber composition for a breaker of the present invention includes carbon black and/or a white filler blended with a rubber component containing a modified natural rubber (HPNR) with a phosphorus content of 200 ppm or less. The use of HPNR with a reduced or eliminated level of phospholipids contained in natural rubber (NR) (preferably HPNR with eliminated levels of proteins and gel fraction as well as them) enables higher fuel economy as compared with the use of NR.

Further, HPNR has a low Mooney viscosity and excellent processability, and can thus be kneaded well even without any particular mastication, which leads to prevention of a reduction in rubber properties (e.g., rubber strength) caused by mastication. As a result, the inherent properties of natural rubber can be maintained, and favorable rubber strength (breaking performance) can be obtained. In addition, HPNR is free of contaminants (pebbles, woodchips, and the like) which TSR and the like contain, and requires no step of removing the contaminants. Therefore, HPNR is excellent in productivity and free from worry about rubber breakage caused by the contaminants. Accordingly, fuel economy and breaking performance can be improved in a balanced manner while excellent processability (productivity) is achieved.

The modified natural rubber (HPNR) has a phosphorus content of 200 ppm or less. When the phosphorus content is more than 200 ppm, a network of phosphorus may be formed in the natural rubber, and this seems to lead to increase in gel content and Mooney viscosity. In addition, the tan δ of the vulcanized rubber tends to increase, possibly with the result that fuel economy and breaking performance are not improved in a balanced manner. The phosphorus content is preferably 150 ppm or less, and more preferably 100 ppm or less. Here, the phosphorus content can be measured by a conventional method such as ICP emission spectrometry. The phosphorus is derived from phospholipids (phosphorus compounds).

The modified natural rubber preferably has a gel content of 20% by mass or less, more preferably 10% by mass or less, and still more preferably 7% by mass or less. A gel content of more than 20% by mass tends to result in reduced processability such as decreased dispersion of filler and increased Mooney viscosity. In addition, the balance of the above performances may not be improved. The gel content refers to the amount determined as a matter insoluble in toluene which is a non-polar solvent. Hereinafter, this content is also referred to simply as "gel content" or "gel fraction". The gel content is determined by the following method. First, a natural rubber sample is immersed in dehydrated toluene and is allowed to stand for one week in a dark place protected from light. Next, the toluene solution is centrifuged for 30 minutes at $1.3 \times 10^4$ rpm so that a toluene-insoluble gel fraction and a toluene-soluble fraction are separated from each other. The toluene-insoluble gel fraction is mixed with methanol to be solidified, and then dried. Finally, the gel content is determined from the ratio of the mass of the dried gel fraction to the mass of the original sample.

The modified natural rubber preferably contains substantially no phospholipids. Here, the phrase "contains substantially no phospholipids" means that no phospholipid peak is present in a range of −3 to 1 ppm in a $^{31}$P NMR measurement of an extract obtained by chloroform extraction from a natural rubber sample. The phospholipid peak present in a range of −3 to 1 ppm refers to a peak corresponding to a phosphate ester structure in the phosphorus component of phospholipids.

The modified natural rubber preferably has a nitrogen content of 0.3% by mass or less, and more preferably 0.15% by mass or less. When the nitrogen content is more than 0.3% by mass, a network of proteins may be formed in the natural rubber, and this seems to lead to increase in gel content and Mooney viscosity. In addition, the balance of the above performances may not be improved. The nitrogen is derived from proteins. The nitrogen content can be determined by a conventional method such as the Kjeldahl method.

Examples of the method for producing the modified natural rubber include a method for producing a modified natural rubber by (A) saponifying natural rubber latex to prepare a saponified natural rubber latex, (B) coagulating the saponified natural rubber latex and treating the resulting coagulated rubber with alkali, and (C) washing the resultant rubber until the phosphorus content in rubber falls to 200 ppm or less. According to this method, the phosphorus content can be reduced. Further, the nitrogen content in rubber can be further decreased.

In the production method, the saponification can be carried out by adding an alkali and optionally a surfactant to natural rubber latex and allowing the mixture to stand for a certain period at a predetermined temperature. Here, the mixture may optionally be stirred or subjected to other operations. According to the production method, phosphorus compounds, which are separated in the saponification, are removed by washing, and thereby the phosphorus content in natural rubber can be reduced. Further, the saponification degrades proteins in natural rubber, which makes it possible to reduce the nitrogen content in natural rubber. In the present invention, the saponification can be carried out by adding an alkali to natural rubber latex, and the addition to natural rubber latex advantageously leads to efficient saponification.

Natural rubber latex is sap extracted from *hevea* trees and contains components such as water, proteins, lipids, and inorganic salts as well as a rubber component. The gel fraction in rubber is thought to be derived from a complex of various impurities in rubber. The latex used in the present invention may be raw latex taken from *hevea* trees by tapping the trees, or purified latex concentrated by centrifugation. Alternatively, high ammonia latex may be used which is produced by adding ammonia to raw rubber latex through a common method so as to inhibit the decay of raw rubber latex due to bacteria existing in the latex and to prevent coagulation of the latex. Alternatively, ammonia may be added to raw latex.

Examples of the alkali used in the saponification include sodium hydroxide, potassium hydroxide, calcium hydroxide, and amine compounds. Among these, sodium hydroxide and potassium hydroxide are particularly preferable in terms of the saponification effects and the effects on stability of natural rubber latex.

In the saponification, the addition amount of alkali is not particularly limited. The minimum addition amount of alkali is preferably 0.1 parts by mass or more, and more preferably 0.3 parts by mass or more, per 100 parts by mass of natural rubber latex (wet). The maximum addition amount of alkali is preferably 12 parts by mass or less, more preferably 10 parts by mass or less, still more preferably 7 parts by mass or less, and particularly preferably 5 parts by mass or less, per 100 parts by mass of natural rubber latex (wet). An addition amount of alkali of less than 0.1 parts by mass may require a long time for saponification. On the other hand, an addition amount of alkali of more than 12 parts by mass may destabilize natural rubber latex.

The surfactant to be used may be an anionic surfactant, a nonionic surfactant, or an ampholytic surfactant. Examples of the anionic surfactant include carboxylate anionic surfactants, sulfonate anionic surfactants, sulfate anionic surfactants, and phosphate anionic surfactants. Examples of the nonionic surfactant include polyoxyalkylene ether nonionic surfactants, polyoxyalkylene ester nonionic surfactants, polyhydric alcohol fatty acid ester nonionic surfactants, sugar fatty acid ester nonionic surfactants, and alkylpolyglycoside nonionic surfactants. Examples of the ampholytic surfactant include amino acid ampholytic surfactants, betaine ampholytic surfactants, and amine oxide ampholytic surfactants. Of these, anionic surfactants are preferable, and sulfonate anionic surfactants are more preferable.

The minimum addition amount of surfactant is preferably 0.01 parts by mass or more, and more preferably 0.1 parts by mass or more, per 100 parts by mass of natural rubber latex (wet). The maximum addition amount of surfactant is preferably 6.0 parts by mass or less, more preferably 5.0 parts by mass or less, and still more preferably 3.5 parts by mass or less, per 100 parts by mass of natural rubber latex (wet). An addition amount of surfactant of less than 0.01 parts by mass may result in destabilization of natural rubber latex during the saponification, and may not lead to decrease in phosphorus, nitrogen, and gel contents in natural rubber. On the other hand, an addition amount of surfactant of more than 6.0 parts by mass may excessively stabilize natural rubber latex, which may make it difficult for the latex to coagulate.

The temperature during the saponification can be appropriately set within a range that allows the saponification with alkali to proceed at a sufficient reaction rate, and within a range that does not cause natural rubber latex to be subjected to denaturation such as coagulation. Generally, the temperature during the saponification is preferably 20° C. to 70° C., and more preferably 30° C. to 70° C. Further, the period of the saponification in the case of allowing natural rubber latex to stand statically is preferably 1 to 72 hours, and more preferably 3 to 48 hours in terms of sufficient level of saponification and improvement of productivity. The length of the period depends on the temperature during the saponification.

After the saponification, the resulting saponified natural rubber latex is coagulated and the coagulated rubber is then optionally broken up. Subsequently, alkali treatment is carried out by bringing the resulting coagulated (and broken)

rubber into contact with an alkali. The alkali treatment enables a further reduction in contents of nitrogen and the like in rubber, which allows the effects of the present invention to be further enhanced. Examples of the coagulation method include a method of adding an acid such as formic acid to latex. The alkali treatment method is not especially limited provided that the rubber is brought into contact with an alkali. For example, a method of immersing the coagulated (and broken) rubber in an alkali may be mentioned. Examples of the alkali that can be used in the alkali treatment include, as well as the alkalis mentioned above for the saponification, potassium carbonate, sodium carbonate, sodium hydrogen carbonate, and ammonia water. Particularly, sodium carbonate is preferable because it highly contributes to the effects of the present invention.

When the alkali treatment is carried out through the immersion, the treatment can be carried out by immersing the rubber (broken rubber) in an aqueous alkali solution with a concentration of preferably 0.1 to 5% by mass, and more preferably 0.2 to 3% by mass. This allows a further reduction in contents of nitrogen and the like in rubber.

When the alkali treatment is carried out through the immersion, the temperature during the alkali treatment can be appropriately determined, and generally is preferably 20 to 70° C. The period of the alkali treatment is preferably 1 to 20 hours and more preferably 2 to 12 hours in terms of sufficient level of treatment and productivity. The length of the period depends on the temperature during the alkali treatment.

Washing treatment is carried out after the alkali treatment, and thereby the phosphorus content and nitrogen content can be reduced. The washing may be carried out, for example, by diluting the rubber with water for washing, and centrifuging the mixture, or allowing the rubber to stand to float, and removing only the water phase to extract rubber. Before the centrifugation, dilution with water is first performed so that the amount of rubber from natural rubber latex (DRC) is 5 to 40% by mass and preferably 10 to 30% by mass. The centrifugation may then be carried out under conditions that provide sufficient centrifugal force for concentration, and such washing may be repeated until the phosphorus content falls to a desired value. Also when the rubber is allowed to stand to float, washing may be carried out by repeating addition of water and stirring until the phosphorus content falls to a desired value. After the washing, the resulting rubber is dried to give a modified natural rubber according to the present invention.

In the production method according to the present invention, the saponification, washing, and drying are preferably completed within 15 days after natural rubber latex is extracted. Further, it is more preferable to complete the saponification, washing, and drying within 10 days, and still more preferably within 5 days after the latex is extracted. This is because the gel content increases if the latex is left to stand for more than 15 days without being solidified after extraction.

The rubber composition of the present invention contains 5% by mass or more, preferably 50% by mass or more, and more preferably 75% by mass or more, of the modified natural rubber based on 100% by mass of the rubber component. A modified natural rubber content of less than 5% by mass may fail to achieve excellent fuel economy, so that both good fuel economy and good breaking performance may not be achieved.

The rubber composition of the present invention may contain other rubbers as long as they do not inhibit the effects. Examples of other rubbers include diene rubbers such as natural rubber (NR), isoprene rubber (IR), styrene butadiene rubber (SBR), acrylonitrile butadiene rubber (NBR), chloroprene rubber (CR), and butyl rubber (IIR).

Examples of the carbon black include, but not particularly limited to, GPF, FEF, HAF, ISAF, and SAF. Carbon black brings the reinforcement effect. Accordingly, the use of carbon black in combination with HPNR allows the effects of the present invention to be favorably achieved.

The nitrogen adsorption specific surface area ($N_2SA$) of the carbon black is preferably 70 $m^2/g$ or more and more preferably 75 $m^2/g$ or more. An $N_2SA$ of less than 70 $m^2/g$ may result in insufficient reinforcement. Also, the $N_2SA$ of the carbon black is preferably 150 $m^2/g$ or less and more preferably 130 $m^2/g$ or less. An $N_2SA$ of more than 150 $m^2/g$ tends to make it difficult to sufficiently disperse the carbon black.

The nitrogen adsorption specific surface area of carbon black herein can be determined in accordance with the method A described in JIS K6217.

The dibutyl phthalate (DBP) oil absorption of the carbon black is preferably 50 ml/100 g or more, more preferably 60 ml/100 g or more, and still more preferably 65 ml/100 g or more. The DBP oil absorption of the carbon black is preferably 150 ml/100 g or less, more preferably 140 ml/100 g or less, and still more preferably 130 ml/100 g or less. When the DBP oil absorption is within such a range, excellent rubber strength as a breaker rubber can be obtained.

The DBP oil absorption of carbon black can be determined by a measuring method in accordance with JIS K6221.

The carbon black content is preferably 20 parts by mass or more, more preferably 35 parts by mass or more, and still more preferably 45 parts by mass or more, per 100 parts by mass of the rubber component. A carbon black content of less than 20 parts by mass may result in insufficient improvement in reinforcement. The carbon black content is preferably 100 parts by mass or less, more preferably 90 parts by mass or less, and still more preferably 80 parts by mass or less, per 100 parts by mass of the rubber component. A carbon black content of more than 100 parts by mass may lead to inappropriate rubber properties and may lower fuel economy.

The white filler may be a filler generally used in the rubber industry, including silica, calcium carbonate, mica such as sericite, aluminum hydroxide, magnesium oxide, magnesium hydroxide, clay, talc, alumina, or titanium oxide. The white filler may be singly used instead of carbon black. Further, the carbon black and the white filler may be used together.

Among the above-mentioned white fillers, silica is preferable in terms of fuel economy and rubber strength. Examples of the silica include dry silica (silicic anhydride) and wet silica (hydrous silicic acid). Among these, wet silica is preferable because such silica contains a larger number of silanol groups.

The nitrogen adsorption specific surface area ($N_2SA$) of the silica is preferably 90 $m^2/g$ or more, and more preferably 100 $m^2/g$ or more. An $N_2SA$ of the silica of less than 90 $m^2/g$ may be unlikely to provide sufficient reinforcement. Also, the $N_2SA$ of the silica is preferably 250 $m^2/g$ or less and more preferably 220 $m^2/g$ or less. An $N_2SA$ of the silica of more than 250 $m^2/g$ tends to decrease dispersion of silica.

Here, the $N_2SA$ of silica can be determined by BET method in accordance with ASTM D3037-81.

When silica is singly used as a reinforcing agent, the rubber composition preferably contains 5 parts by mass or more, and more preferably 7 parts by mass or more, of silica relative to 100 parts by mass of the rubber component. Also, the rubber composition preferably contains 100 parts by mass or less, and more preferably 90 parts by mass or less, of silica relative to 100 parts by mass of the rubber component. When the silica content is within such a range, high fuel economy can be obtained, so that both good fuel economy and good breaking performance can be achieved.

The total content of carbon black and a white filler in the rubber composition of the present invention is preferably 30 parts by mass or more, more preferably 45 parts by mass or more, and still more preferably 50 parts by mass or more, per 100 parts by mass of the rubber component. Also, the total content is preferably 120 parts by mass or less, more preferably 100 parts by mass or less, and still more preferably 90 parts by mass or less, per 100 parts by mass of the rubber component. When the total content is within such a range, excellent breaking performance can be provided. Further, the use of filler in such an amount in combination with HPNR allows good fuel economy without decreasing the filler amount.

When the rubber composition of the present invention contains silica, silane coupling agents that are widely used in the rubber field, e.g., sulfide, mercapto, vinyl, amino, glycidoxy, nitro, and chloro ones, may be mixed.

In the present invention, sulfur is preferably used as a vulcanizing agent.

The sulfur content is preferably 1 part by mass or more and more preferably 1.5 parts by mass or more, per 100 parts by mass of the rubber component. The sulfur content is preferably 10 parts by mass or less, more preferably 7 parts by mass or less, and still more preferably 5 parts by mass or less, per 100 parts by mass of the rubber component. A sulfur content within such a range leads to favorable crosslinking density, excellent fuel economy, excellent breaking performance, and good adhesion to codes.

The rubber composition of the present invention preferably contains a cobalt salt of organic acid. The cobalt salt of organic acid can improve adhesion between codes and rubber. Cobalt stearate, cobalt naphthenate, and the like are preferably used. The amount of cobalt salt of organic acid is preferably 0.05 to 0.5 parts by mass and more preferably 0.15 to 0.3 parts by mass, calculated as cobalt, per 100 parts by mass of the rubber component.

In the present invention, an antioxidant is generally used. Amine type antioxidants are preferably used because they provide excellent breaking performance. Examples of amine type antioxidants include amine derivatives such as diphenylamines (e.g., p-(p-toluenesulfonylamide)-diphenylamine), and p-phenylenediamines (e.g., N-(1,3-dimethylbutyl)-N'-phenyl-p-phenylenediamine (6PPD), N-phenyl-N'-isopropyl-p-phenylenediamine (IPPD)).

The antioxidant content is preferably 0.5 parts by mass or more, and more preferably 1 part by mass or more, per 100 parts by mass of the rubber component. Also, the antioxidant content is preferably 6 parts by mass or less, and more preferably 4 parts by mass or less, per 100 parts by mass of the rubber component. An antioxidant content within such a range allows better breaking performance.

In the rubber composition of the present invention, the oil content is preferably 5 parts by mass or less, more preferably 1 part by mass or less, and still more preferably 0.5 parts by mass or less, per 100 parts by mass of the rubber component. Particularly preferably, the rubber composition is free of oil. In the present invention, HPNR allows better processability so that the oil content can be reduced, and therefore a decrease in breaking performance owing to oil can be eliminated.

The rubber composition of the present invention may optionally contain compounding ingredients generally used in the rubber industry, in addition to the ingredients described above. Examples of the compounding ingredients include stearic acid, zinc oxide, waxes, and vulcanization accelerators.

The rubber composition for a breaker of the present invention is used for a breaker which is placed radially outward from a carcass and inward of a tread. Specifically, the rubber composition for a breaker of the present invention can be used for breakers illustrated in FIG. 3 of JP 2003-94918 A, FIG. 1 of JP 2004-67027 A, and FIGS. 1 to 4 of JP H04-356205 A.

The rubber composition for a breaker of the present invention is produced by a common method. Specifically, for example, the ingredients described above are kneaded by an apparatus such as a Banbury mixer, a kneader, or an open roll mill, and then vulcanized, whereby a rubber composition can be produced.

The pneumatic tire of the present invention can be produced as follows. Tire codes are coated with the above rubber composition for a breaker, molded into the shape of a breaker, and then assembled with other tire components to prepare an unvulcanized tire. Then, this unvulcanized tire is vulcanized, and thus a pneumatic tire (e.g., radial tire) can be produced.

EXAMPLES

The following will mention the present invention specifically with reference to Examples, but the present invention is not limited only thereto.

The respective chemical agents used in Examples and Comparative Examples are listed below.
Natural rubber latex: field latex available from Muhibbah Lateks
Surfactant: Emal-E27C (sodium polyoxyethylene lauryl ether sulfate) available from Kao Corp.
NaOH: NaOH available from Wako Pure Chemical Industries, Ltd.
Saponified natural rubber A: see Preparation 1 below
Saponified natural rubber B: see Preparation 2 below
NR: TSR20
SBR: SBR1502 (styrene content: 23.5% by mass) available from JSR Corp.
Carbon black (LI): DIABLACK LI ($N_2SA$: 105 $m^2/g$, DBP oil absorption: 78 ml/100 g) available from Mitsubishi Chemical Corp.
Silica: Ultrasil VN3 ($N_2SA$: 175 $m^2/g$) available from EVONIK-DEGUSSA
Zinc oxide: Zinc oxide #1 available from Mitsui Mining & Smelting Co., Ltd.
Cobalt stearate: cost-F (cobalt content: 9.5% by mass) available from DIC Synthetic Resins
Antioxidant 6C: NOCRAC 6C(N-(1,3-dimethylbutyl)-N'-phenyl-p-phenylenediamine) available from Ouchi Shinko Chemical Industrial Co., Ltd.
Insoluble sulfur: Crystex HSOT20 (insoluble sulfur containing 80% by mass of sulfur and 20% by mass of oil) available from Flexsys
Vulcanization accelerator DCBS: NOCCELER DZ-G available from Ouchi Shinko Chemical Industrial Co., Ltd.
Modified resorcin resin: Sumikanol 620 (modified resorcinol-formaldehyde condensate) available from Sumitomo Chemical Co., Ltd.
Partial condensate of hexamethylol melamine pentamethyl ether (HMMPME): Sumikanol 507 (modified etherified methylol melamine resin, containing 35% by mass of silica and oil) available from Sumitomo Chemical Co., Ltd.

(Production of Saponified Natural Rubber)

Preparation 1

The solids content (DRC) of natural rubber latex was adjusted to 30% (w/v). Next, 1000 g of the natural rubber latex (wet) was added with 25 g of 10% Emal-E27C aqueous solution and 50 g of 40% NaOH aqueous solution and then saponified for 48 hours at room temperature, whereby a saponified natural rubber latex was produced. The saponified latex was added with water to be diluted to a DRC of 15% (w/v). The diluted latex was then added with formic acid, while being slowly stirred, so that the pH was adjusted to 4.0. The latex was coagulated, and the coagulated rubber was broken up and immersed in 1% sodium carbonate aqueous solution at room temperature for 5 hours. Then, the rubber was removed from the solution and repeatedly washed with 1000 ml of water. The resultant rubber was subsequently dried for 4 hours at 90° C., and thereby a solid rubber (saponified natural rubber A) was produced.

Preparation 2

A solid rubber (saponified natural rubber B) was produced in the same manner as in Preparation 1, except that the amount of the NaOH aqueous solution was changed to 25 g.

TSR and the solid rubbers produced in Preparations 1 and 2 were determined for nitrogen, phosphorus, and gel contents in the following ways. Table 1 shows the results.

(Determination of Nitrogen Content)

The nitrogen content was determined with CHN CORDER MT-5 (produced by Yanaco Analytical Instruments Corp.). In determination, first, a calibration curve for determining the nitrogen content was prepared with antipyrin taken as a reference material. Then, an about 10 mg sample of TSR or the saponified natural rubber produced in each Preparation was weighed out and subjected to the determination. From three determination results was calculated the average value, which was taken as the nitrogen content of the sample.

(Determination of Phosphorus Content)

The phosphorus content was determined with an ICP emission spectrometer (ICPS-8100, produced by Shimadzu Corp.).

$^{31}$P-NMR measurement of phosphorus was also performed as follows. Chloroform extracts from the raw rubbers were purified and then dissolved in $CDCl_3$ to prepare test samples. The test samples were analyzed with an NMR spectrometer (400 MHz, AV400M, produced by Bruker Japan Co., Ltd.) based on the standard (0 ppm) that was the determined peak corresponding to the P atom of 80% phosphoric acid aqueous solution.

(Determination of Gel Content)

70.00 mg of each raw rubber sample cut in a size of 1 mm×1 mm was weighed, mixed with 35 mL of toluene, and allowed to stand for one week in a cool and dark place. Next, the mixture was centrifuged so that a toluene-insoluble gel fraction was precipitated, and a toluene-soluble supernatant was removed. Then, the gel fraction alone was solidified with methanol and dried. The mass of the dried gel fraction was measured, and then used in the following formula to determine the gel content (%).

Gel content(% by mass)=[Mass of dried gel fraction (mg)/Mass of original sample(mg)]×100

TABLE 1

|  | Saponified natural rubber A (Preparation 1) | Saponified natural rubber B (Preparation 2) | TSR |
|---|---|---|---|
| Nitrogen content (% by mass) | 0.12 | 0.28 | 0.36 |
| Phosphorus content (ppm) | 82 | 127 | 602 |
| Gelcontent (% by mass) | 6.0 | 14.9 | 29.8 |

As shown in Table 1, the saponified natural rubbers A and B (HPNR) were found to have decreased nitrogen, phosphorus, and gel contents as compared with TSR. Further, neither of the modified natural rubbers produced in Preparations 1 and 2 showed any peak corresponding to phospholipids between −3 ppm and 1 ppm in a $^{31}$P-NMR spectrum of an extract thereof.

Examples and Comparative Examples

In accordance with each formulation (expressed by part(s) by mass) shown in Tables 2 to 6, the chemical agents other than the sulfur and the vulcanization accelerator were kneaded by a 1.7-L Banbury mixer to form a kneaded mass. Next, the sulfur and the vulcanization accelerator were added to the resultant kneaded mass, and they were kneaded with an open roll mill. Thereby, an unvulcanized rubber composition was produced. The produced unvulcanized rubber composition was press-vulcanized for 30 minutes at 150° C., so that a vulcanized rubber composition (vulcanized rubber sheet) was produced.

Note that in Comparative Examples where TSR was used, a peptizer was added in an amount of 0.2 parts by mass to 100 parts by mass of TSR, and the mixture was masticated and then cooled prior to kneading.

The produced vulcanized rubber sheets were evaluated in the following ways. Tables 2 to 6 show the evaluation results.

(Rolling Resistance)

The tan δ at 50° C. of each of the vulcanized rubber sheets was determined with a viscoelasticity spectrometer VES (product of Iwamoto Seisakusho Co., Ltd.) under the following conditions: an initial strain of 10%; a dynamic strain of ±1%; and a frequency of 10 Hz. The tan δ of each vulcanized rubber sheet was expressed as an index, which is relative to the tan δ of Comparative Examples 1 to 4 (standards) (=100). The larger the index value, the less the heat build-up, which indicates better fuel economy.

(Rolling resistance index)=(Tan δ of Comparative Examples 1 to 4)/(Tan δ of each sheet)×100

(Rubber Strength)

A No. 3 dumbbell specimen prepared from each of the vulcanized rubber sheets was subjected to tensile tests in accordance with JIS K 6251 "Rubber, vulcanized or thermoplastic—Determination of tensile stress-strain properties", so that the tensile strength at break (TB) and the elongation at break (EB) of each specimen were determined to calculate a product thereof (TB×EB). The calculated product (TB×EB) was used in the following formula to calculate a rubber strength (TB×EB) index. The resultant index is relative to the product (TB×EB) of Comparative Examples 1 to 4 (standards) (=100). The larger the rubber strength index value, the higher the rubber strength.

(Rubber strength index)=(TB×EB of each specimen)/ (TB×EB of Comparative Examples 1 to 4)×100

TABLE 2

|  | Example 1 | Example 2 | Comparative Example 1 |
|---|---|---|---|
| Saponified natural rubber A | 100 | — | — |
| Saponified natural rubber B | — | 100 | — |
| NR | — | — | 100 |
| Carbon black (LI) | 65 | 65 | 65 |
| Zinc oxide | 10 | 10 | 10 |
| Cobalt stearate | 2 | 2 | 2 |
| Antioxidant 6C | 1.5 | 1.5 | 1.5 |
| Insoluble sulfur (pure sulfer content) | 3.75(3.0) | 3.75(3.0) | 3.75(3.0) |
| Vulcanization accelerator DCBS | 1.5 | 1.5 | 1.5 |
| Modified resorcin resin | 1.5 | 1.5 | 1.5 |
| HMMPME | 2 | 2 | 2 |
| Rolling resistance index | 109 | 110 | 100 |
| Rubber strength index | 116 | 113 | 100 |
| Processability (mastication) | Not necessary | Not necessary | Necessary |

TABLE 3

|  | Example 3 | Example 4 | Comparative Example 2 |
|---|---|---|---|
| Saponified natural rubber A | 100 | — | — |
| Saponified natural rubber B | — | 100 | — |
| NR | — | — | 100 |
| Carbon black (LI) | 65 | 65 | 65 |
| Zinc oxide | 10 | 10 | 10 |
| Cobalt stearate | 2 | 2 | 2 |
| Antioxidant 6C | 1.5 | 1.5 | 1.5 |
| Insoluble sulfur (pure sulfer content) | 3.75(3.0) | 3.75(3.0) | 3.75(3.0) |
| Vulcanization accelerator DCBS | 1.5 | 1.5 | 1.5 |
| Modified resorcin resin | 2 | 2 | 2 |
| HMMPME | 3 | 3 | 3 |
| Rolling resistance index | 108 | 111 | 100 |
| Rubber strength index | 112 | 112 | 100 |
| Processability (mastication) | Not necessary | Not necessary | Necessary |

TABLE 4

|  | Example 5 | Example 6 | Comparative Example 3 |
|---|---|---|---|
| Saponified natural rubber A | 100 | — | — |
| Saponified natural rubber B | — | 100 | — |
| NR | — | — | 100 |
| Carbon black (LI) | 55 | 55 | 55 |
| Silica (ultrasil VN3) | 10 | 10 | 10 |
| Zinc oxide | 10 | 10 | 10 |
| Cobalt stearate | 2 | 2 | 2 |
| Antioxidant 6C | 1.5 | 1.5 | 1.5 |
| Insoluble sulfur (pure sulfer content) | 3.75(3.0) | 3.75(3.0) | 3.75(3.0) |
| Vulcanization accelerator DCBS | 1.5 | 1.5 | 1.5 |
| Modified resorcin resin | 1.5 | 1.5 | 1.5 |
| HMMPME | 2 | 2 | 2 |
| Rolling resistance index | 111 | 107 | 100 |
| Rubber strength index | 110 | 106 | 100 |
| Processability (mastication) | Not necessary | Not necessary | Necessary |

TABLE 5

|  | Example 7 | Example 8 | Comparative Example 4 |
|---|---|---|---|
| Saponified natural rubber A | 100 | — | — |
| Saponified natural rubber B | — | 100 | — |
| NR | — | — | 100 |
| Carbon black (LI) | 55 | 55 | 55 |
| Silica (ultrasil VN3) | 10 | 10 | 10 |
| Zinc oxide | 10 | 10 | 10 |
| Cobalt stearate | 2 | 2 | 2 |
| Antioxidant 6C | 1.5 | 1.5 | 1.5 |
| Insoluble sulfur (pure sulfer content) | 3.75(3.0) | 3.75(3.0) | 3.75(3.0) |
| Vulcanization accelerator DCBS | 1.5 | 1.5 | 1.5 |
| Modified resorcin resin | 2 | 2 | 2 |
| HMMPME | 3 | 3 | 3 |
| Rolling resistance index | 112 | 109 | 100 |
| Rubber strength index | 104 | 104 | 100 |
| Processability (mastication) | Not necessary | Not necessary | Necessary |

TABLE 6

|  | Example 9 | Example 10 | Example 11 | Example 12 | Comparative Example 1 |
|---|---|---|---|---|---|
| Saponified natural rubber A | 90 | 75 | 90 | 60 | — |
| Saponified natural rubber B | — | — | — | — | — |
| NR | 10 | 25 | — | 40 | 100 |
| SBR | — | — | 10 | — | — |
| Carbon black (LI) | 65 | 65 | 65 | 65 | 65 |
| Zinc oxide | 10 | 10 | 10 | 10 | 10 |
| Cobalt stearate | 2 | 2 | 2 | 2 | 2 |
| Antioxidant 6C | 1.5 | 1.5 | 1.5 | 1.5 | 1.5 |
| Insoluble sulfur (pure sulfur content) | 3.75(3.0) | 3.75(3.0) | 3.75(3.0) | 3.75(3.0) | 3.75(3.0) |
| Vulcanization accelerator DCBS | 1.5 | 1.5 | 1.5 | 1.5 | 1.5 |
| Modified resorcin resin | 1.5 | 1.5 | 1.5 | 1.5 | 1.5 |
| HMMPME | 2 | 2 | 2 | 2 | 2 |
| Rolling resistance index | 108 | 106 | 107 | 104 | 100 |
| Rubber strength index | 115 | 110 | 104 | 105 | 100 |
| Processability (mastication) | Not necessary | Not necessary | Not necessary | Necessary [1] | Necessary |

[1] 0.2 phr of peptizer was added and masticated, but the mixing time for this was much shorter than Comparative Example 1 (around half).

The results in Tables 2 and 3 show that the rubber compositions with carbon black in Examples 1 to 4, each of which contained HPNR, achieved great improvements in fuel economy and breaking performance compared with the rubber compositions in Comparative Examples 1 and 2, each of which contained TSR. Further, the rubber compositions in the Examples exhibited excellent processability, and good fuel economy despite the absence of mastication.

Tables 4 and 5 show that the rubber compositions with silica in Examples also achieved great improvements in fuel economy and breaking performance, and exhibited favorable processability.

Table 6 shows that the rubber compositions with a HPNR/SBR blend or HPNR/TSR blend (TSR content: 10% by mass or 25% by mass) also achieved great improvements in fuel economy and breaking performance, and exhibited favorable processability. The rubber composition with a blend of 60% by mass of HPNR and 40% by mass of TSR achieved improvements in fuel economy and breaking performance, and also exhibited greatly improved processability compared to the rubber composition of Comparative Example 1 as the mastication time was reduced to about half.

The invention claimed is:

1. A pneumatic tire comprising a breaker produced using a rubber composition for a breaker, comprising:
   a rubber component that contains a modified natural rubber, the rubber having a phosphorus content of 200 ppm or less; and
   carbon black and/or a white filler,
   wherein the rubber composition contains 5% by mass or more of the modified natural rubber based on 100% by mass of the rubber component.

2. The pneumatic tire according to claim 1,
   wherein the modified natural rubber has a nitrogen content of 0.3% by mass or less and a gel content of 20% by mass or less, the gel content being determined as the amount of a toluene-insoluble matter.

3. The pneumatic tire according to claim 1,
   wherein the modified natural rubber is produced by saponifying natural rubber latex.

4. The pneumatic tire according to claim 1,
   wherein the modified natural rubber is obtained by:
   (A) saponifying natural rubber latex to prepare a saponified natural rubber latex;
   (B) coagulating the saponified natural rubber latex and treating the resulting coagulated rubber with alkali; and
   (C) washing the resultant rubber until the phosphorus content in rubber falls to 200 ppm or less.

5. The pneumatic tire according to claim 1,
   wherein the white filler is silica.

* * * * *